US005199074A

United States Patent [19]

Thor

[11] Patent Number: 5,199,074

[45] Date of Patent: Mar. 30, 1993

[54] ENCRYPTION SYSTEM

[75] Inventor: Allen B. Thor, Livingston, N.J.

[73] Assignee: Advanced Micro Devices, Inc., Sunnyvale, Calif.

[21] Appl. No.: 817,150

[22] Filed: Jan. 6, 1992

[51] Int. Cl.[5] ............ H04L 9/06

[52] U.S. Cl. ............ 380/50; 380/41

[58] Field of Search ............ 380/50, 41, 49

[56] References Cited

U.S. PATENT DOCUMENTS

| | | | |
|---|---|---|---|
| 4,221,931 | 9/1980 | Seiler | 380/50 |
| 4,379,205 | 4/1983 | Wyner | 380/50 |
| 4,408,093 | 10/1983 | Place | 380/50 |
| 4,791,669 | 12/1988 | Kage | 380/50 X |
| 4,914,697 | 3/1990 | Dabbish et al. | 380/50 X |
| 5,046,095 | 9/1991 | Akiyama | 380/50 |

*Primary Examiner*—Gilberto Barron, Jr.

*Attorney, Agent, or Firm*—Foley & Lardner

[57] ABSTRACT

A communication system transmits and receives encrypted digital signal samples. The system includes a generator for generating digital signal samples to be encrypted and an encryption memory for storing the encrypted digital signal samples. The digital signal samples address the encryption memory which provides the encrypted digital signal samples responsive to the digital signal samples. The system further includes a transmitter for transmitting the encrypted digital signal samples and a receiver for receiving the encrypted digital signal samples. The system further includes a decryption memory for storing the digital signal samples at storage locations complimentary to the encrypted digital signal sample storage locations of the encryption memory. The encrypted digital signal samples address the decryption memory to cause the decryption memory to provide the digital signal samples responsive to the encrypted digital signal samples for reproducing the original digital signal samples.

32 Claims, 2 Drawing Sheets

ENCRYPTION SYSTEM

BACKGROUND OF THE INVENTION

The present invention generally relates to a communication system for transmitting and receiving encrypted digital signal samples. The present invention more particularly relates to an encryption system for use in such a communication system for providing encrypted digital signal samples from digital signal samples to be encrypted.

In the transmission of data or voice intelligence, digital techniques are often employed to enhance or improve transmission quality and effectiveness. One application for such digital techniques is in cordless portable telephone systems wherein the amplitude of analog signals representing speech are quantized and multiple-bit digital samples representing the quantized speech amplitudes are used to modulate a radio frequency carrier. The radio frequency carrier is transmitted over a radio frequency channel for reception at a distant point, such as a base station. At the receiving point, the digital samples are extracted from the carrier and are converted to analog signals which are applied to a speaker, for example, for reproducing the original speech.

Because such transmissions are conducted in the radio frequency spectrum, they are available for reception by any one having suitable receiving equipment. Hence, such transmissions are not secure transmissions. In order to secure such transmissions, the digital samples are encrypted or transformed pursuant to a predetermined encryption code. As a result, the received encrypted transmissions will be unintelligible unless the receiving equipment incorporates decryption apparatus for decrypting the transmissions in a manner complimentary to the encryption code.

While encryption and decryption systems of the prior art have been generally successful in securing radio frequency digital transmissions, they have exhibited some deficiencies. For example, such systems can require alteration of the transmission bit rate requiring more complicated equipment to receive and decrypt the digital samples than would otherwise be necessary. Also, encryption systems of the prior art can degrade reception quality by not providing an accurate reconstruction of the original analog signals. Further, prior encryption systems can be inflexible in not allowing the encryption code to be altered during transmissions to render the transmissions more secure.

SUMMARY OF THE INVENTION

The invention therefore provides an encryption system for providing encrypted digital signal samples from digital signal samples to be encrypted. The system includes memory means including a plurality of addressable memory locations for storing the encrypted digital signal samples, an address input for receiving the digital signal samples to be encrypted, and a data port for providing the encrypted digital signal samples responsive to the received digital signal samples. The system further includes programming means for providing the memory means with the encrypted digital signal samples. The programming means includes addressing means for storing each one of the encrypted digital signal samples at a predetermined unique memory location of the memory means.

The present invention still further provides a communication system for transmitting and receiving encrypted digital signal samples. The communication system includes generating means for generating digital signal samples to be encrypted. Encryption memory means including a first plurality of addressable storage locations for storing the encrypted digital signal samples at predetermined storage locations. The memory means including an address input for receiving the digital signal samples for addressing the encrypted digital signal samples and a data port for providing the encrypted digital signal samples responsive to the digital signal samples and transmitting means for transmitting the encrypted digital signal samples. The system further includes receiving means for receiving the encrypted digital signal samples and decryption memory means including a second plurality of addressable storage locations for storing the digital signal samples at storage locations complimentary to the encrypted digital sample storage locations, the memory means including an address input for receiving the encrypted digital signal samples for addressing the digital signal samples and a data port for providing the digital signal samples responsive to the encrypted digital signal samples.

The system may further include encryption programming means for providing the encryption memory means with the encrypted digital signal samples, wherein the encryption programming means includes addressing means for storing the encrypted digital signal samples at the predetermined ones of the storage locations and decryption programming means for providing the decryption memory means with the digital signal samples, wherein the decryption programming means includes addressing means for storing the digital signal samples at the storage locations complimentary to the encrypted digital signal sample storage locations of the encryption memory means.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

DETAILED DESCRIPTION OF THE PREFERRED EMBODIMENT

Figure 1:
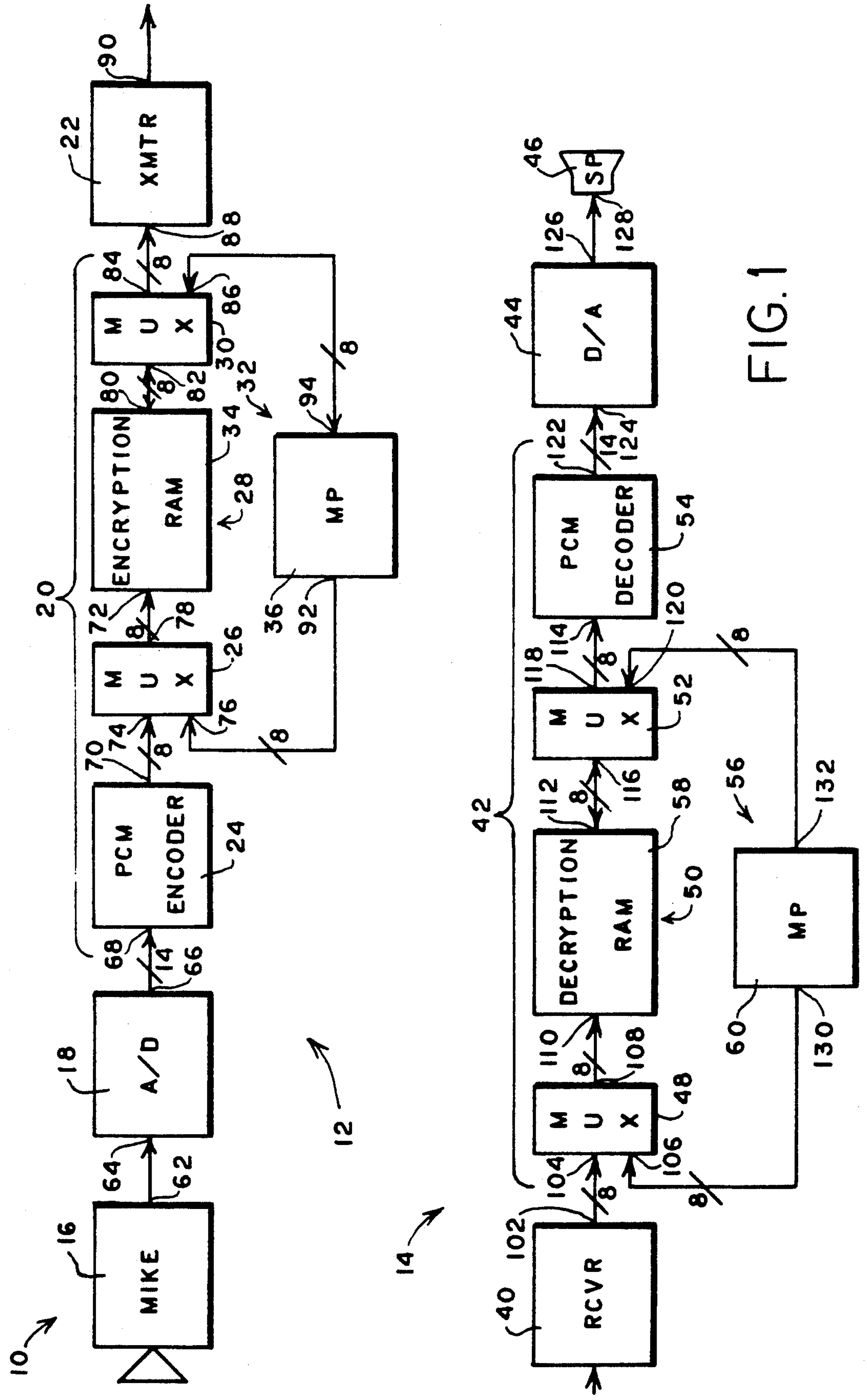
FIG. 1 is a block schematic diagram of a transmission system employing encryption and decryption in accordance with a first preferred embodiment of the present invention.

Referring now to FIG. 1, it illustrates in block diagram form, a communication system 10 embodying the present invention. The communication system 10 includes a transmitting section 12 and a receiving section 14.

The transmitting section 12 generally includes a microphone 16, an analog to digital converter 18, an encryption system 20 embodying the present invention, and a transmitting means 22. The encryption system 10 generally includes a pulse code modulation (PCM) encoder 24, a first multiplexer 26, a memory means 28, a second multiplexer 30, and a programming means 32. The memory means 28 is preferably a random access memory 34 referred to herein as the encryption random access memory. The programming means 32 preferably comprises a microprocessor 36.

The receiving section 14 generally includes a receiving means 40, a decryption system 42, a digital to analog converter 44, and a speaker 46. The decryption system 42 generally includes a first multiplexer 48, a decryption memory means 50, a second multiplexer 52, a PCM decoder 54, and a decryption programming means 56. The decryption memory means 50 preferably comprises a random access memory 58 referred to herein as the decryption random access memory. The decryption programming means 56 preferably comprises a microprocessor 60.

The microphone 16 converts human speech to analog electrical signals representing the human speech and provides the analog electrical signals at an output 62. The analog electrical signals representing the human speech are conveyed to an input 64 of the analog to digital converter 18 which digitizes the analog electrical signals into multiple-bit linear digital signal samples comprising, for example, 14 bits. The 14-bit linear digital signal samples are conveyed from an output 66 of the analog to digital converter 18 to an input 68 of the PCM encoder 24. In a manner well known in the art, the PCM encoder 24 quantizes the linear 14-bit digital signal samples into 8-bit digital signal samples. The 8-bit digital signal samples are provided by the PCM encoder 24 at an output 70 and are the digital signal samples to be encrypted by the encryption system 20.

The output 70 of PCM encoder 24 is coupled to an address input 72 of the encryption random access memory 34 by the first multiplexer 26. The encryption random access memory 34 is preferably of the type which includes a plurality of addressable storage locations wherein each storage location stores an 8-bit byte of information which, in accordance with the present invention, is an encrypted 8-bit digital signal sample. As a result, the encryption random access memory 34 stores the encrypted digital signal samples at respective different unique storage locations therein which are addressed by the 8-bit digital signal samples to be encrypted provided by the PCM encoder 24.

The multiplexer 26 includes first and second inputs 74 and 76 respectively and an output 78. The first input 74 is coupled to the output 70 of the PCM encoder 24 for receiving the digital signal samples to be encrypted. When the communication system 10 is in its normal transmission mode, the multiplexer 26 couples the first input 74 to its output 78 to thereby convey the digital signal samples to be encrypted to the address input 72 of the encryption random access memory 34. This enables the digital signal samples to be encrypted to address the storage locations of the encryption random access memory 34 which contain the encrypted digital signal samples.

Responsive to receiving the digital signal samples to be encrypted at its address input 72, the encryption random access memory 34 provides the encrypted digital signal samples at a data port 80. The data port 80 is coupled to the transmitting means 22 through the second multiplexer 30. To that end, the second multiplexer 30 includes a port 82. The port 80 of the encryption random access memory 34 and the port 82 of the multiplexer 30 may both be utilized as an input or an output. During transmission, the port 80 is utilized as an output and the port 82 is utilized as an input. The multiplexer 30 couples its port 82 to an output 84 when the communication system is in the normal transmission mode. As a result, the encrypted digital signal samples are conveyed from the port 80 of the encryption random access memory 34 through the multiplexer 30 and to an input 88 of the transmitting means 22. The transmitting means 22 is of the type well known in the art which serializes the encrypted digital signal samples and modulates a radio frequency carrier with the digital signal samples for transmission on a radio frequency channel from its output 90.

The programming means 32 including the microprocessor 36 stores the encrypted digital signal samples in the encryption random access memory 34 in accordance with a predetermined code. To that end, the microprocessor 36 includes an address output 92 for providing memory addresses to input 76 of multiplexer 26. When the encryption random access memory 34 is being programmed, the multiplexer 26 selectively couples its second input 76 to its output 78 for conveying the memory addresses from the microprocessor to the encryption random access memory 34. Coincidently with the conveyance of the memory addresses, the microprocessor 36 provides from a data output 94 the encrypted digital signal samples to an input 86 of multiplexer 30. When the encryption random access memory 34 is being programmed, the encrypted digital signal samples provided by the microprocessor 36 are conveyed to the data port 80 of the encryption random access memory 34 through the multiplexer 30 by the multiplexer coupling its input 86 to its port 82. Thus, in the programming of the encryption random access memory 34, the port 82 is utilized as an output and the port 80 is utilized as a data input. The data path including input 94, output 86, input port 82, and output port 80 is also provided for verifying the programming of the encryption memory 34. The operation of the microprocessor 36 may also be emulated by discrete logic or microcoded sequencers.

As can be appreciated from the foregoing, each digital signal sample to be encrypted received at input 72 of the encryption random access memory 34 corresponds to a unique one of the storage locations of the encryption random access memory 34 and hence a unique one of the encrypted digital signal samples provided to the encryption random access memory 34 by the microprocessor 36. As will be seen hereinafter, the decryption system 42 of the receiving section 14 includes the decryption random access memory 58 which also includes a plurality of 8-bit storage locations for storing the digital signal samples at the storage locations which are complimentary to the encrypted digital signal sample storage locations of the encryption random access memory 34. As will also be seen, this provides decryption of the encrypted signal samples for reproducing the original digital signal samples and to the ultimate end of reproducing the original human speech.

Referring more specifically to the receiving section 14, the receiving means 40 is of the type well known in the art which is tuned for receiving the radio frequency carrier channel which is modulated by the encrypted digital signal samples. The receiving means 40 extracts the encrypted digital signal samples and converts the digital signal samples from serial format to parallel format to provide 8-bit encrypted digital signal samples at its output 102.

The receiving means 40 is coupled to the decryption random access memory 58 through the multiplexer 48. To that end, the multiplexer 48 includes first and second inputs 104 and 106 and an output 108. When the receiving section 14 is in a receiving mode, the multiplexer 48 selectively couples its input 104 to its output 108 for conveying the encrypted digital signal samples to the address input 110 of decryption random access memory 58. This enables the encrypted digital signal samples to address the storage locations of the decryption random access memory 58 and thus the original digital signal samples stored therein. Responsive to the encrypted digital signal samples received at its address input 110, the decryption random access memory 58 provides at its data port II2 the corresponding original digital signal samples. The data port 112 of the decryption random access memory 58 is coupled to the input 114 of PCM decoder 54 by the multiplexer 52. To that end, the multiplexer 52 includes a port 116, an output 118, and an input 120. When the encrypted digital signal samples are provided from the decryption random access memory 58 to the PCM decoder 54, the port 112 is utilized as an output and the port 116 is utilized as an input. The multiplexer 52 selectively couples the port 116 to its output 118 to thereby convey the digital signal samples from the decryption random access memory 58 to the PCM decoder 54 at its input 114. The PCM decoder 54 is of the type well known in the art which linearizes the quantized digital signal samples received at its input 114 to provide multiple-bit linear digital signal samples comprising, for example, 14 bits at its output 122. The linearized digital signal samples are then conveyed to an input 124 of the digital to analog converter 44 for conversion to electrical analog signals. The electrical analog signals are provided by the digital to analog converter 44 at its output 126 which is coupled to the input 128 of speaker 46. The speaker 46 converts the analog electrical signals representative of the original human speech to audible human speech.

The decryption programming means 56 operates in a complimentary manner to the programming means 32. To that end, the microprocessor 60 includes an address output 130 which is coupled to the input 106 of the multiplexer 48. The microprocessor 60 at output i30 provides addresses for the decryption random access memory 58. The microprocessor 60 further includes a data output 132 for providing the digital signal samples to the multiplexer 52 at input 120. Multiplexer 48, when the decryption random access memory 58 is being programmed for decryption, couples input 106 to output 108 to provide the decryption random access memory 58 with the memory addresses generated by the microprocessor 60. Coincidently therewith, the microprocessor 60 provides from output 132 the digital samples to input 120 of multiplexer 52. The multiplexer 52 couples the input 120 to its port 116 for conveying to port 112 of decryption random access memory 58 the digital signal samples to be stored in the decryption random access memory 58.

The microprocessor 60 stores the digital signal samples in the decryption random access memory 58 in a manner which is complimentary to the encryption digital signal sample storage locations of the encryption random access memory 34. For example, if a digital sample has an 8-bit binary value of it addresses the storage location of the encryption random access memory 34 having that address. If the encrypted digital signal sample stored at that storage location is 10101010, when that encrypted digital signal sample is received by the decryption random access memory 58, it will address the storage location of the decryption random access memory having the address 10101010. The microprocessor 60 will have stored in that memory location the original digital signal sample of 11110000 so that the original digital signal sample of 1I110000 will be made available to the PCM decoder 54. Hence, the decryption programming means 56 stores the digital signal samples at the storage locations of the decryption random access memory 58 complimentary to the encryption digital signal sample storage locations of the encryption memory means 34.

Since the digital signal samples in accordance with this preferred embodiment comprise 8 bits, the encryption random access memory 34 and the decryption random access memory 58 preferably include at least 256 storage locations with each storage location capable of storing a unique 8-bit value for one of the possible 8-bit values of digital signal samples. Furthermore, as will be appreciated by those skilled in the art, more than 16 million encryption codes are made possible with one encryption code corresponding to no encryption of the digital signal samples. As will also be appreciated by those skilled in the art, the present invention is equally as applicable to communication systems which utilize adaptive pulse code modulation (ADPCM) encoding wherein 4-bit signal samples are utilized. When ADPCM encoding is utilized, of course, fewer encryption codes are made possible.

As will also be appreciated by those skilled in the art, the communication system of the present invention for encrypting the digital signal samples is quite flexible and even during a transmission, the encryption random access memory 34 and the decryption random access memory 58 may be reprogrammed to a different encryption code by the encryption programming means 32 and the decryption programming means 56. Furthermore, the bit rate of the communication system 10 is not altered by the encryption system 20 or the decryption system 42.

Figure 2:
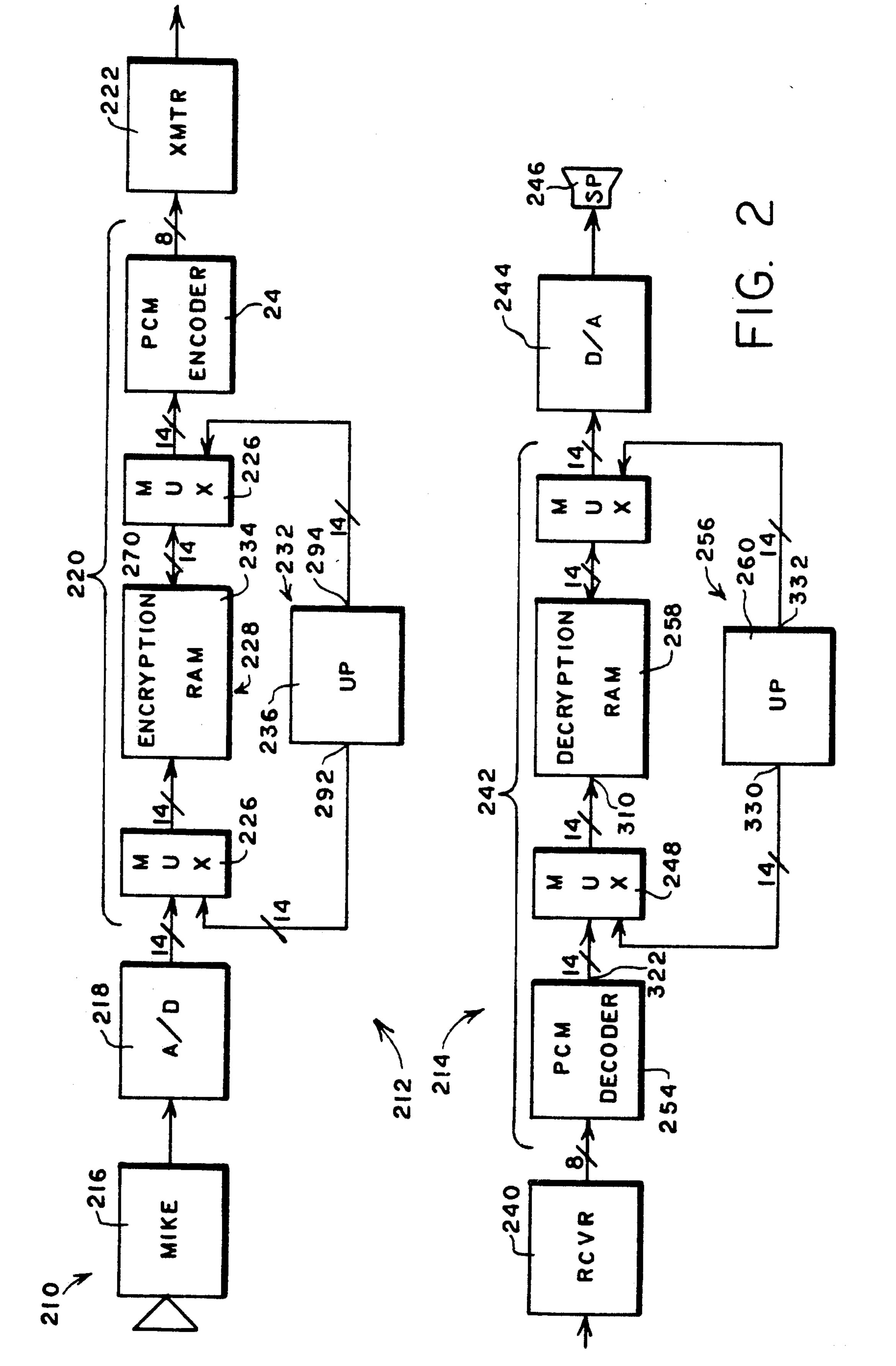
FIG. 2 is a block schematic diagram of a communication system employing encryption and decryption in accordance with a second preferred embodiment of the present invention.

Referring now to FIG. 2, it illustrates another communication system 210 which is structured in accordance with a second embodiment of the present invention. The communication system 210 includes a transmitting section 212 and a receiving section 214. The communication system 210 is substantially identical to the communication system 10 of FIG. 1 except that the PCM encoder 24 of the encryption system 220 is coupled to the data port 270 of the encryption random access memory 234 by the second multiplexer 226. Also, the output 322 of the PCM decoder 254 is coupled to the address input 310 of the decryption random access memory 258 by the first multiplexer 248. As a result, the encryption random access memory 234 receives addressing digital signal samples from the analog to digital converter 218 having 14 bits and the decryption random access memory 258 receives encrypted digital signal samples having 14 bits. Correspondingly, the microprocessors 236 and 260 generate 14-bit addresses for the encryption random access memory 234 and the decryption random access memory 258 respectively. Microprocessor 236 provides encrypted digital signal samples of 14 bits, and similarly, microprocessor 260 provides the complimentary digital signal samples having 14 bits. As can be appreciated from the foregoing, the embodiment of FIG. 2 provides a greater number of encryption codes than the embodiment of FIG. 1.

In all other respects, the operation of the communication system 210 of FIG. 2 is identical to the operation of the communication 10 of FIG. 1.

Like the communication system 10 of FIG. 1, the communication system 210 of FIG. 2 may also be utilized with ADPCM encoding. In addition, the encryption system 220 and the decryption system 242 do not alter the transmission bit rate of the transmission system 210 when the encryption system 220 and decryption system 242 are operative to enable the transmission and reception of encrypted digital signal samples.

While particular embodiments of the present invention have been shown and described, modifications may be made. For example, the present invention may be practiced by using reprogrammable non-volatile memories such as EEROM, a flash memory or a VVROM of the type known in the art in place of the random access memories. In addition, the programming of the encryption an decryption memories may be accomplished with discrete logic or microcoded sequencers in place of the microprocessors. It is therefore intended in the appended claims to cover all such changes and modifications which fall within the true spirit and scope of the invention.

What is claimed is:

1. An encryption system for providing encrypted digital signal samples from digital signal samples to be encrypted, said system comprising:

memory means including a plurality of addressable memory locations for storing said encrypted digital signal samples, an address input for receiving said digital signal samples to be encrypted, and a data port for providing said encrypted digital signal samples responsive to said received digital signal samples; and programming means for providing said memory means with said encrypted digital signal samples, said programming means including addressing means for storing each one of said encrypted digital signal samples at a predetermined unique memory location of said memory means, said programming means comprising a microprocessor having an address output for providing memory means addresses for addressing said memory locations of said memory means and a data output coupled to said memory means data port for providing said memory means with said encrypted digital signal samples.

2. An encryption system as defined in claim 1 further including a first multiplexer for providing said memory mean address input with either said digital signal samples to be encrypted or said memory means addresses from said microprocessor and a second multiplexer for providing said encrypted digital signal samples from said memory means data port or for providing said memory means data port with said encrypted digital signal samples from said microprocessor.

3. An encryption system as defined in claim 1 wherein said memory means comprises a random access memory or reprogrammable non-volatile memory such as EEROM, flesh or UVROM.

4. An encryption system as defined in claim 1 wherein said memory means comprises a reprogrammable non-volatile memory.

5. An encryption system as defined in claim 1 further including encoder means coupled to said memory means address input for providing said memory means with said digital signal samples to be encrypted.

6. An encryption system as defined in claim 5 wherein said encoder means comprises a pulse code modulation encoder.

7. An encryption system as defined in claim 5 wherein said encoder means comprises an adaptive pulse code modulation encoder.

8. An encryption system as defined in claim 1 further including encoder means coupled to said memory means data port for encoding said encrypted digital signal samples.

9. An encryption system as defined in claim 8 wherein asid encoder means comprises a pulse code modulation encoder.

10. An encryption system as defined in claim 8 wherein said encoder means comprises an adaptive pulse code modulation encoder.

11. A communication system for transmitting and receiving encrypted digital signal samples, said system comprising:

generating means for generating digital signal samples to be encrypted;

encryption memory means including a first plurality of addressable storage locations for storing said encrypted digital signal samples at predetermined ones of said storage locations, said memory means including an address input for receiving said digital signal samples for addressing said encrypted digital signal samples and a data port for providing said encrypted digital signal samples responsive to said digital signal samples;

transmitting means for transmitting said encrypted digital signal samples;

receiving means for receiving said encrypted digital signal samples;

decryption memory means including a second plurality of addressable storage locations for storing said digital signal samples at storage locations complimentary to said encrypted digital signal sample storage locations of said encryption memory means, said decryption memory means including an address input for receiving said encrypted digital signal samples for addressing said digital signal samples and a data port for providing said digital signal samples responsive to said encrypted digital signal samples; and encryption programming means for providing said encryption memory means with said encrypted digital signal samples, said encryption programming means including addressing means for storing said encrypted digital signal samples at said predetermined ones of said storage locations.

12. A system as defined in claim 11 wherein said encryption programming means comprises a microprocessor having an address output for providing memory means addresses for addressing said storage locations of said encryption memory means and a data output coupled to said encryption memory means data port for providing said memory means with said encrypted digital signal samples.

13. A system as defined in claim 12 further including a first multiplexer for providing said encryption memory mean address input with either said digital signal samples to be encrypted or said memory means addresses from said microprocessor and a second multiplexer for providing said encrypted digital signal samples from said encryption memory means data port or for providing said encryption memory means data port with said encrypted digital signal samples from said microprocessor.

14. A system as defined in claim 11 further including decryption programming means for providing said decryption memory means with said digital signal samples, said decryption programming means including addressing means for storing said digital signal samples at said storage locations complimentary to said encrypted digital signal sample storage locations of said encryption memory means.

15. A system as defined in claim 14 wherein said decryption programming means comprises a microprocessor having an address output for providing memory means addresses for addressing said storage locations of said decryption memory means and a data output coupled to said decryption memory means data port for providing said decryption memory means with said digital signal samples.

16. A system as defined in claim 15 further including a first multiplexer for providing said decryption memory means address input with either said encrypted digital signal samples or said memory means addresses from said microprocessor and a second multiplexer for providing said digital signal samples from said decryption memory means data port or for providing said decryption memory means data port with said digital signal samples from said microprocessor.

17. A system as defined in claim 11 wherein said encryption memory means comprises a random access memory.

18. A system as defined in claim 11 wherein said encryption memory means comprises a reprogrammable non-volatile memory.

19. A system as defined in claim 11 further including encoder means coupled to said encryption memory means address input for providing said encryption memory means with said digital signal samples to be encrypted.

20. A system as defined in claim 19 wherein said encoder means comprises a pulse code modulation encoder.

21. A system as defined in claim 19 wherein said decoder means comprises an adaptive pulse code modulation decoder.

22. A system as defined in claim 11 further including encoder means coupled to said encryption memory means data port for encoding said encrypted digital signal samples.

23. A system as defined in claim 22 wherein said decoder means comprises a pulse code modulation decoder.

24. A system as defined in claim 22 wherein said decoder means comprises an adaptive pulse code modulation decoder.

25. A system as defined in claim 11 wherein said decryption memory means comprises a random access memory.

26. A system as defined in claim 11 wherein said decryption memory means comprises a reprogammable non-volatile memory.

27. A system as defined in claim 11 further including decoder means coupled to said decryption memory means data port for decoding said digital signal samples.

28. A system as defined in claim 27 wherein said decoder means comprises a pulse code modulation decoder.

29. A system as defined in claim 27 wherein said decoder means comprises an adaptive pulse code modulation decoder.

30. A system as defined in claim 11 further including decoding means coupled to said decryption memory means address input for providing said decryption memory means with said encrypted digital signal samples.

31. A system as defined in claim 30 wherein said decoder means comprises a pulse code modulation decoder.

32. A system as defined in claim 30 wherein said decoder means comprises an adaptive pulse code modulation decoder.

* * * * *